United States Patent [19]

Emmons

[11] Patent Number: 5,513,438
[45] Date of Patent: May 7, 1996

[54] VEHICLE WHEEL ALIGNMENT SYSTEM

[76] Inventor: J. Bruce Emmons, 31695 Auburn, Birmingham, Mich. 48009

[21] Appl. No.: 298,025

[22] Filed: Aug. 29, 1994

[51] Int. Cl.⁶ .................................................. G01B 5/24
[52] U.S. Cl. .................................................... 33/203.12
[58] Field of Search ........................... 33/203.12, 203.13, 33/203.14, 203.15, 288

[56] References Cited

U.S. PATENT DOCUMENTS

| | | | |
|---|---|---|---|
| 3,187,440 | 6/1965 | Merrill et al. . | |
| 3,579,845 | 5/1971 | Hunter et al. | 33/203.13 |
| 3,685,161 | 8/1972 | MacPherson | 33/228 |
| 3,758,213 | 9/1973 | Macpherson et al. | 356/155 |
| 3,812,592 | 5/1974 | Haupt | 33/203.13 |
| 3,832,786 | 9/1974 | Macpherson et al. | 33/228 |
| 3,871,106 | 3/1975 | Hegenbart | 33/203.12 |
| 4,099,333 | 7/1978 | Forster | 33/203.12 |
| 4,158,961 | 6/1979 | Ben-David | 73/117 |
| 4,307,515 | 12/1981 | Harant | 33/203.13 |
| 4,330,945 | 5/1982 | Eck | 33/288 |
| 4,338,027 | 7/1982 | Eck | 356/155 |
| 4,393,694 | 7/1983 | Marten et al. | 73/177 |
| 4,631,832 | 12/1986 | Schrammen et al. | 33/203.12 X |
| 4,901,442 | 2/1990 | Fujii | 33/203.13 |
| 4,901,560 | 2/1990 | Hirano et al. | 73/117 |
| 4,945,645 | 8/1990 | Brugelmeir, Jr. | 33/203.14 |
| 4,962,644 | 10/1990 | Polacek . | |
| 5,088,320 | 2/1992 | Fukuda et al. | 73/118.1 |
| 5,090,235 | 2/1992 | Hirano et al. | 33/203.13 X |
| 5,105,546 | 4/1992 | Weise et al. | 33/203.12 |
| 5,105,547 | 4/1992 | Fujii | 33/203.13 |
| 5,111,585 | 5/1992 | Kawashima et al. | 33/203.12 |
| 5,150,515 | 11/1992 | Merrill et al. | 33/203.12 |
| 5,267,380 | 12/1993 | Ronge et al. | 33/203.12 X |
| 5,313,710 | 5/1994 | Wakamori et al. | 33/203.12 |

*Primary Examiner*—William A. Cuchlinski, Jr.
*Assistant Examiner*—G. Bradley Bennett
*Attorney, Agent, or Firm*—Howard & Howard

[57] ABSTRACT

A vehicle wheel support and alignment system includes a pair of rollers that are mounted on swing arms that independently pivot relative to a base. The rollers rotate and pivot relative to the base as they support the load of the vehicle wheel. The pivot position of the rollers relative to the base is indicative of whether the vehicle wheel is in a desired alignment. A method of determining proper wheel alignment that utilizes angular information available from the independently pivotable swing arms is also disclosed.

18 Claims, 5 Drawing Sheets

VEHICLE WHEEL ALIGNMENT SYSTEM

BACKGROUND OF THE INVENTION

1. Field of the Invention

This invention generally relates to a wheel alignment system, and more particularly, to a device for supporting a vehicle wheel in a wheel alignment system and a methodology for providing proper wheel alignment using the inventive wheel support system.

2. Description of the Prior Art

Wheel alignment machines that are used in modern vehicle assembly plants typically include a pair of support rollers at each wheel that is to be adjusted. One of the rollers is typically powered. The rollers support the weight of the vehicle while allowing the wheel to be rotated during the alignment process. Typically, support rollers are mounted on a movable carriage, however, their axes are constrained to remain parallel to each other throughout the alignment process. The wheel is rotated upon the parallel aligned rollers in order to determine the true axis of rotation of the wheel regardless of the presence of irregularities in the wheel or tire, commonly referred to as "run out".

Wheel alignment machines having rollers fixed in a parallel axes alignment have significant drawbacks associated with them. First, the constrained parallel alignment of the rollers results in undesirable lateral forces acting on the tires by the rollers, forcing the wheel out of its normal operating position, therefore leading to inaccuracies in the alignment settings.

One attempt at eliminating such undesirable lateral forces is disclosed in U.S. Pat. No. 3,187,440, wherein the magnitude of the lateral forces is measured and used to reposition the carriage until the side forces at each roller are approximately zero. The system of the '440 patent is effective, however, the feedback control system taught by the '440 patent is relatively expensive and complex, thereby, limiting the availability of such machines.

Further disadvantages associated with the prior art include the inability to repeatedly achieve accurate results in an alignment machine. Such drawbacks are especially significant in an assembly plant environment. Assembly plant alignment machines also preferably include the characteristics of having short cycle times, no attachments or physical contact with the vehicle, wheels, or the tire side walls, and no vulnerable protrusions or sensors above the floor level in the plant. None of the prior art devices provide these advantageous characteristics in an economical manner.

A further disadvantage associated with the prior art is that, in most alignment machines the vehicle is physically restrained from moving laterally by the inclusion of bumpers or additional rollers. The physical restraints are typically used to maintain stable tracking of the vehicle during the alignment process. This is necessary in order to perform the appropriate measurements and adjustments. The bumpers and/or rollers associated with the prior art are considered undesirable because they do not meet the desired characteristics of assembly plant alignment machines set forth above. Further, the use of the physical restraints implies the existence of unbalanced lateral forces at the tires.

Alignment machines that are used in service applications (i.e. dealerships or repair shops) do not require the high throughput of the assembly plant machines. Therefore, machines used in service applications are typically less expensive than the assembly plant machines, however, they are more labor intensive in order to complete the alignment process.

Further, prior art wheel alignment machines are typically very complicated in structure and in functional components. Conventional wheel alignment devices are therefore difficult to manufacture, expensive to produce, and more susceptible to malfunction.

This invention addresses the various drawbacks and shortcomings of the prior art by providing a mechanical structure that is relatively inexpensive, easy to use and effective to consistently provide precise wheel alignment measurement. This invention provides a simple and robust mechanical system able to quickly and precisely measure the angular orientation of the wheel.

One object of this invention is to provide an improved method of measurement of the angular orientation of a rotating wheel.

Another object of this invention is to rotate the wheels to be aligned while eliminating undesirable lateral forces that are otherwise introduced onto the wheel or suspension of the vehicle.

A further object of this invention is to provide stable tracking behavior of the vehicle on the alignment machine without resorting to external restraints.

In accordance with the above recited objects of this invention, it is an important aspect of this invention that the load bearing rollers are independently movable on swing arms. This feature allows for the elimination of all undesirable lateral forces at the contact points between the tire and the rollers. It is a further aspect of this invention that each wheel is contacted and supported by only two rollers, which also facilitate the function of measuring the orientation of the wheels.

SUMMARY OF THE INVENTION

In general terms this invention provides a vehicle wheel support device for use in wheel alignment operations that includes a base. A first roller is mounted on the base such that the first roller rotates relative to the base about a first roller axis and such that the first roller pivots relative to the base. A second roller is mounted on the base such that the second roller rotates relative to the base about a second roller axis and such that the second roller pivots relative to the base. The first and second rollers independently pivot relative to the base. The first and second rollers are adapted to support the vertical load of a vehicle wheel that is placed upon them.

In the preferred embodiment of the inventive support device the first roller is mounted on the base by a first swing arm that pivots relative to the base about a first pivot axis. The second roller is mounted on the base by a second swing arm that pivots about a second pivot axis relative to the base. The first and second swing arms are mounted on the base such that the pivot axes are nonparallel.

DETAILED DESCRIPTION OF THE PREFERRED EMBODIMENTS

Figure 1:
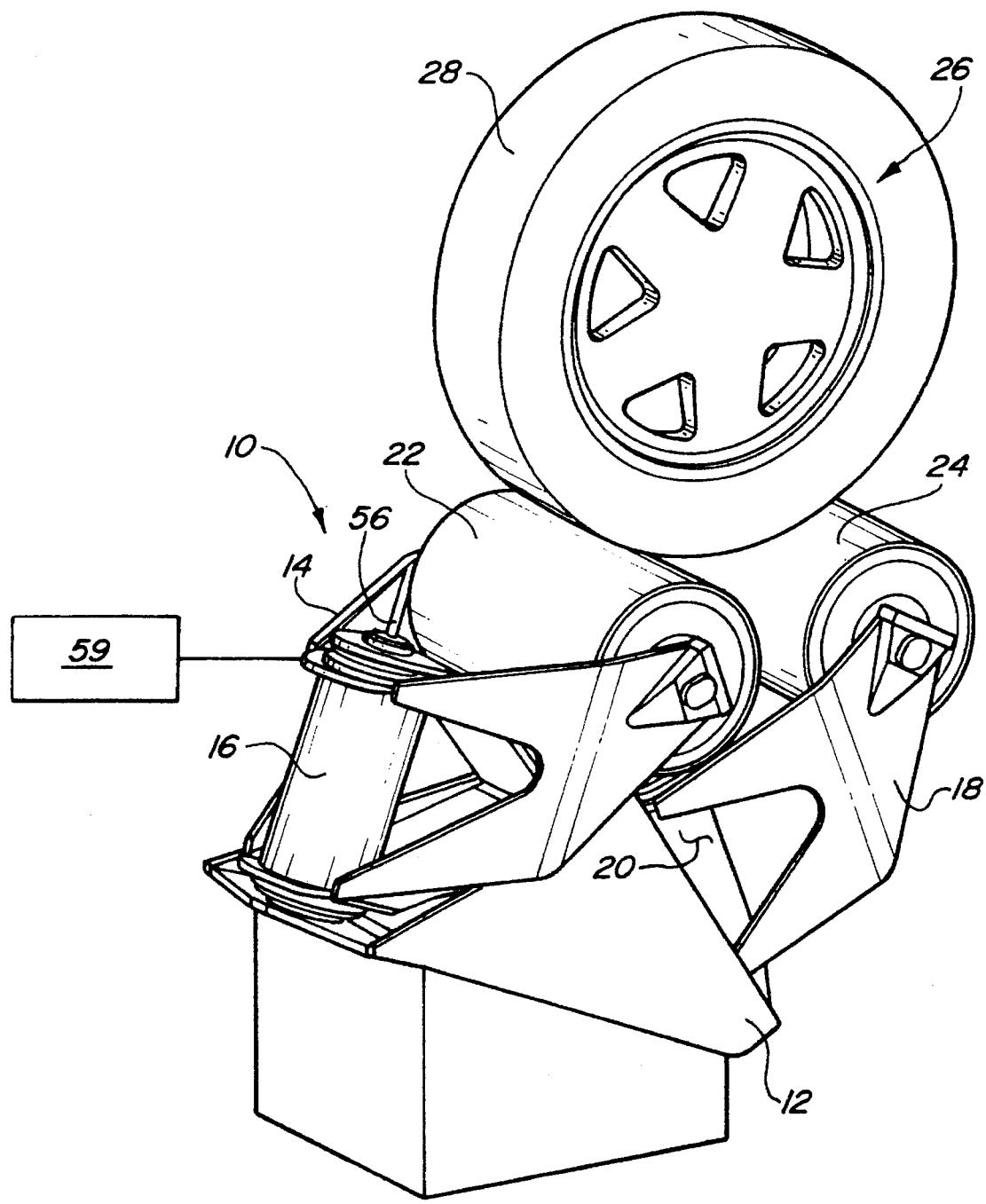
FIG. 1 is a perspective view of the preferred embodiment of a wheel support system designed in accordance with this invention.

FIG. 1 is a perspective view illustrating the preferred embodiment of the wheel support device of this invention. Wheel support 10 includes base 12 that is preferably fixably attached to a platform such that it is maintained in a stable position for supporting a vehicle wheel. First swing arm is coupled to base 12 through antifriction bearings inside of bearing tube 16 which is part of swing am 14. Swing arm 14 pivots or swings about an axis coincident with the centerline through bearing tube 16 as will be more fully described in detail below. Second swing arm 18 is rotatably or pivotally coupled to base 12 through anti-friction bearings through bearing tube 20. First roller 22 is mounted upon swing arm 14 such that roller 22 rotates relative to base 12 and swing arm 14. Second roller 24 is rotatably mounted onto swing am 18 such that roller 24 rotates relative to base 12 and swing arm 18, respectively.

In the illustrated embodiment, swing arms 14 and 18 have a central portion and a pair of extensions extending from the central portion. As can be appreciated from the drawings, swing arms 14 and 18 support the rollers between the pair of extensions such that the rollers are spaced apart from the central portions.

Swing arms 14 and 18, respectively, are designed in conjunction with base 12 such that either base 12 or the swing arms include a stop that limits the amount of relative pivoting between them. In one embodiment, swing arms 14 and 18 pivot approximately ±15 degrees from a reference point relative to base 12.

Wheel 26 is supported upon first roller 22 and second roller 24. Treaded surface 28 of wheel 26 preferably contacts the outer cylindrical surfaces of rollers 22 and 24, respectively.

Figure 2:
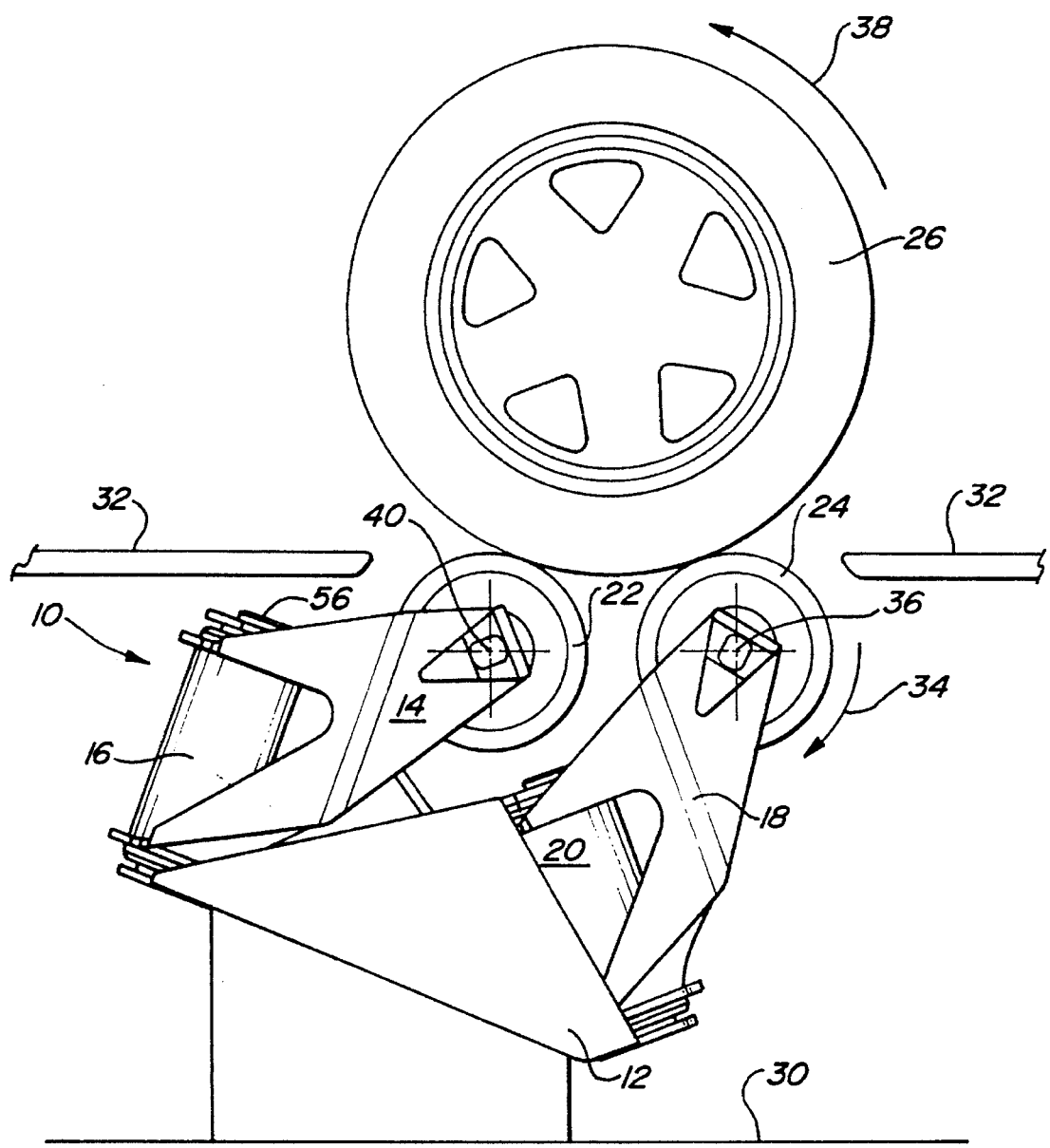
FIG. 2 is a side plan view of the embodiment of FIG. 1.

As shown in FIG. 2, base 12 is mounted upon a platform or subfloor 30. Subfloor 30 is located beneath a floor 32 of an assembly plant, for example. It is to be understood that floor 32 could also be a track, along which vehicles are propelled through the assembly line process. FIG. 2 illustrates one embodiment of mounting wheel support 10 beneath an assembly plant floor 32 in order to facilitate efficient positioning of a vehicle such that the wheels 26 are supported upon rollers 22 and 24.

Second roller 24 is preferably propelled by a rotary motor 33 (shown in FIG. 3) in a conventional manner such that roller 24 rotates in the direction indicated by arrow 34 about roller axis 36. In the most preferred embodiment, the motor is mounted internally within roller 24. Such movement by roller 24 causes wheel 26 to rotate about its axes in a direction indicated by arrow 38. Such movement by wheel 26, in turn, causes roller 22 to rotate about its axes 40 in the direction indicated by arrow 34. The purpose for providing rotation of roller 24 and, therefore, wheel 26 is to perform an alignment function in one of two ways. The first way being according to a conventional alignment/measuring device or by using the inventive wheel support 10 and the inventive system and methodology for determining wheel alignment to be described in detail below.

An important aspect of this invention is providing rollers 22 and 24 on independently movable swing arms 14 and 18, respectively. Swing arm 14 swivels or pivots relative to base 12 about the central axis through bearing tube 16. Similarly, swing arm 18 pivots relative to base 12 about an axis coincident with the central axis through bearing tube 20. The two swing arms pivot independently of each other relative to base 12. The movement of the swing arms, and corresponding rollers, is dictated by the orientation and placement of wheel 26 upon rollers 22 and 24. The orientation of wheel 26 is described by the steer and camber angles of the wheel 26. For purposes of this discussion, steer angle can be defined as the angle between a vertical plane containing the wheel axis and a vertical transverse reference plane. Camber angle can be defined as the angle between the wheel axis and a horizontal reference plane. Toe angle is the difference in steer angles between the right and left wheels.

Figure 3:
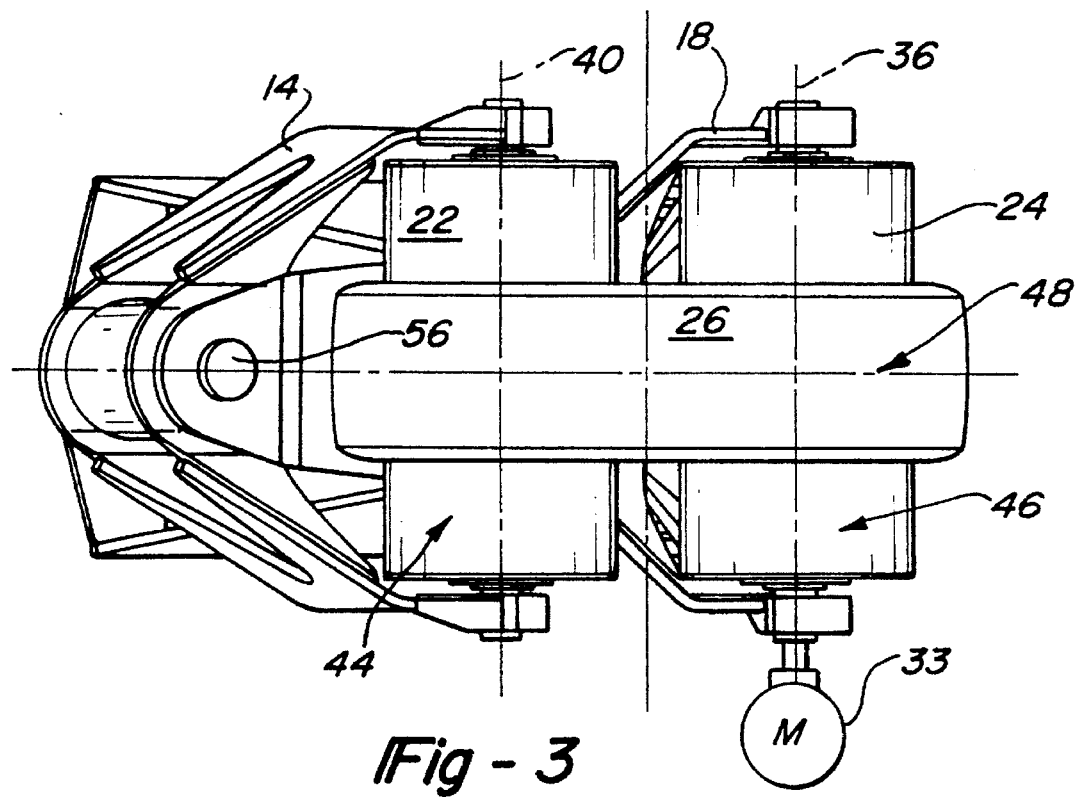
FIG. 3 is a top plan view of the embodiment of FIG. 1 showing the orientation of the rollers when a wheel is in a first orientation and position relative to the rollers.

FIG. 3 is a top plan view of the embodiment of FIGS. 1 and 2 illustrating swing arm 14 and, therefore, roller 22 in a position 44. Swing arm 18 and, therefore, roller 24 are in position 46. The illustrative parallel alignment between axis 36 and axis 40 are dictated by the position 48 of wheel 26 having steer and camber angles equal to zero.

Figure 4:
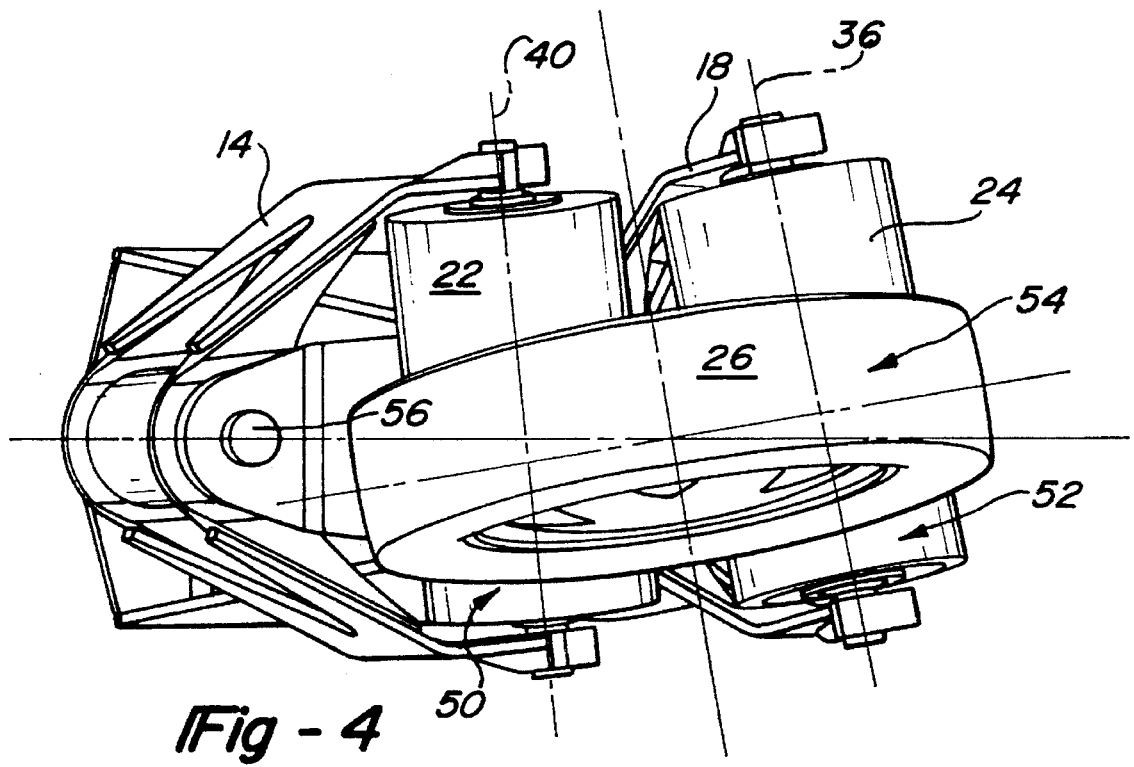
FIG. 4 is a top plan view of the embodiment of FIG. 1 showing the orientation of the rollers when a wheel is in a second orientation and position relative to the rollers.

FIG. 4 is a top plan view showing the embodiment of FIGS. 1 and 2 in another orientation. Swing arm 14 and, therefore, roller 22 are illustrated in position 50. Swing arm 18 and, therefore, roller 24 are illustrated in position 52. Positions 50 and 52 are dictated in part by the second orientation of wheel axis relative to the horizontal and transverse reference planes. The orientation characterized by the roller position 50 and roller position 52 and the location of wheel 26 on rollers 22 and 24 are dictated by the steer and camber angles of wheel 26. As can be seen in FIG. 4, axes 36 and 40 are no longer in a generally parallel alignment. This is because swing arm 14 pivoted relative to base 12 independently of swing arm 18 pivoting relative to base 12, due to the angles associated with wheel 26.

Angle transducers 56 and 58 are provided upon bearing tubes 16 and 20, respectively, in order to provide a measurement of the angle of rotation or position of swing arms 14 and 18, respectively. As will be described in more detail below, the angle of rotation of the swing arms is useful for determining proper alignment of wheel 26. Although the illustrated embodiment includes angle transducers 56 and 58 as a means for determining the angle of the swing arms relative to the base, alternative conventional means for measuring the angles are also useful. As one example, a laser position detecting system could be used. Whatever angle or position determining means is used, it is preferably coupled to a conventional microprocessor or computer 59, which determines an alignment orientation of wheel 26.

Figure 5:
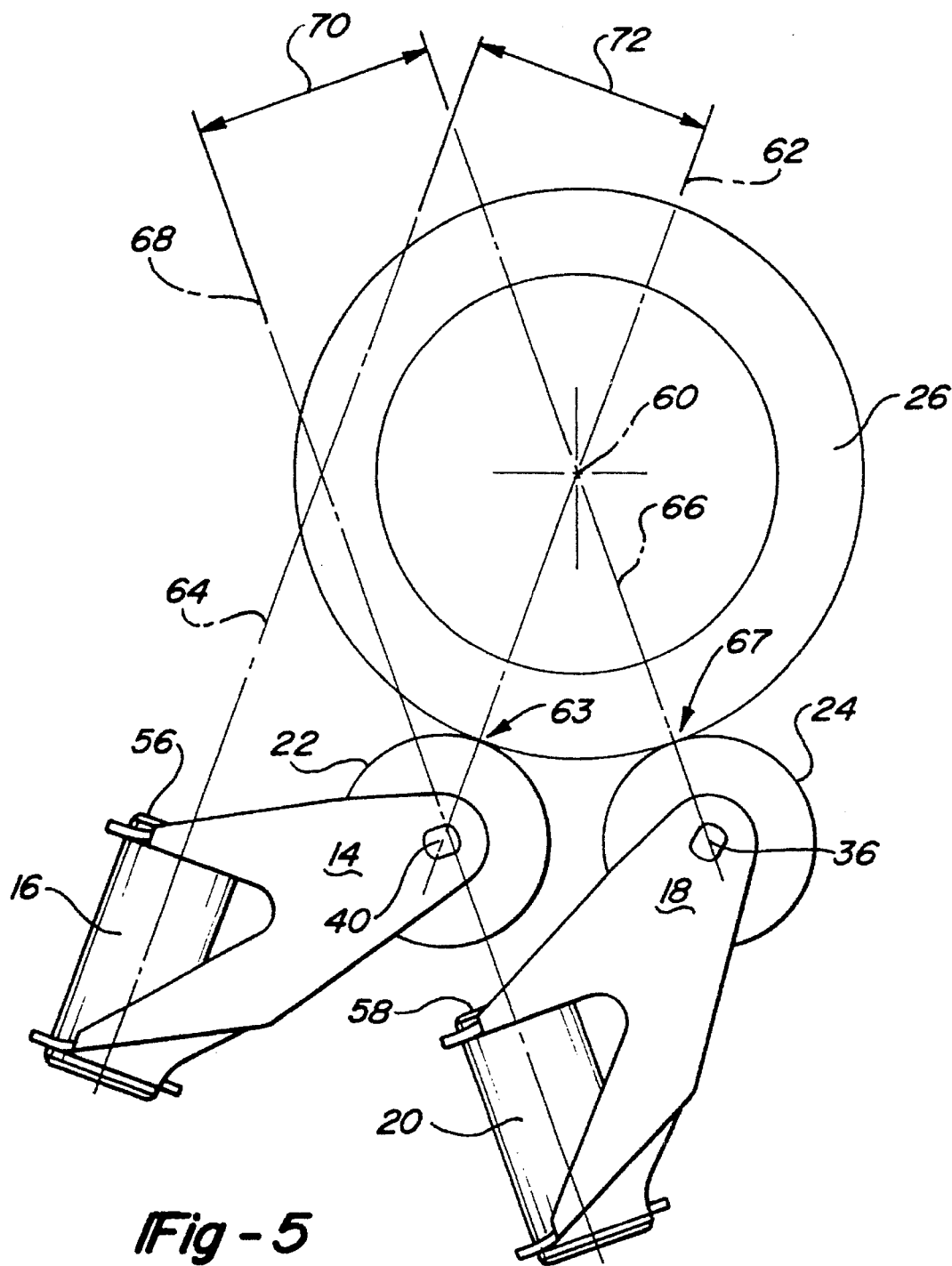
FIG. 5 is a side plan diagrammatic view of portions of the inventive wheel support system illustrating a preferred geometry and methodology for aligning a wheel associated with this invention.

Another important aspect of this invention is the geometry associated with the positioning of the rollers and swing arms relative to the base and wheel. As illustrated in FIG. 5, the preferred geometry has the following characteristics. Wheel 26 rotates about a central point 60 which is also defined herein as the wheel axis of rotation. Broken line 62 runs directly through the wheel axis of rotation 60 and the roller axis 40 of roller 22. Line 62 also is coincident with the point of contact 63 between roller 22 and wheel 26. The pivot axis of swing arm 14 relative to base 12, which is coincident with a central axis of bearing tube 16 is represented by broken line 64. As can be appreciated by the drawing, line 62 is parallel with line 64. It is important that the pivot axis of swing arm 14 and, therefore roller 22, (i.e. line 64) be forward of the wheel axis of rotation 60. Forward as used herein, is to be considered in the direction of rotation of wheel 26; that is to the left according to the drawings.

Similarly, broken line 66 goes directly through the wheel axis of rotation 60, the point of contact 67 between roller 24 and wheel 26 and the axis of rotation 36 of roller 24. Broken line 58, which is coincident with the pivot axis of swing arm 18 and therefore roller 24 is parallel to broken line 66 and forward of the axis of rotation 60 of wheel 26.

The inclination of the swing arm axis or pivot axis is an important feature of this invention. With the geometry shown in FIG. 5, the direction of the vector of the supporting force is aligned with the swing arm pivot axis and, therefore, has a negligible affect on the position of the swing arm. This is true even when wheel 26 is offset laterally from a central position on rollers 22 and 24. This is to be contrasted with an embodiment wherein the swing arm pivot axes are in a parallel, vertical alignment. In the later embodiment, the weight of the vehicle would force the wheel down between the rollers, wedging them apart, whenever the wheel was laterally offset from the midpoint of the rollers. Such a scenario introduces inaccuracies into the alignment settings and results in a reduction in tracking stability.

In the preferred embodiment, the spacing 70 between lines 66 and 68 and spacing 72 between line 62 and 64 are maintained constant because of the mounting of rollers 22 and 24 on their respective swing arms. The spacing between forward roller axis 40 and rear roller axis 36 is maintained constant because of the mounting of swing arms 14 and 18 to the base 12. Differing tire diameters on wheel 26 will dictate deviations from a single, ideal geometry. In practice, however, it is possible to accommodate a reasonable range of tire diameters given a single geometry without adversely affecting the accuracy of the alignment settings. In situations where tires of widely different diameters will be encountered, an adjustment can be provided to vary the spacing between the rollers. The spacing between the rollers can be changed, however, the characteristics of the illustrated geometry are preferably maintained. Specifically, the pivot axis of the respective swing arms should be parallel with the lines going through the axis of rotation of the rollers, the points of contact between the wheel and the rollers and the wheel axis of rotation, respectively. Also, the pivot axes of the swing arms should be maintained somewhat forward of the wheel axis of rotation.

The movement and function of rollers 22 and 24, along with swing arms 14 and 18, will become apparent to those skilled in the art from the following description of the function of wheel support system 10.

In most assembly plant environments, the vehicle is driven or propelled along a track or floor 32 into a position where, at least, the two front wheels of the vehicle are placed upon wheel supports to complete a wheel alignment operation. An independent pair of rollers and associated swing arms and base will be provided for each of the front wheels of the vehicle, respectively. Accordingly, it is preferable to provide base 12 mounted upon platform 30 such that the spacing between individual bases can be modified to accommodate vehicles of varying width.

In operation, there are two patches of rolling contact for each wheel supported by a roller assembly 10. For purposes of discussion and simplicity, the following description will refer to points of contact between the wheel 26 and rollers 22 and 24. Although this designation of a point of contact is more accurate for a planar wheel, one skilled in the art will understand the following description. Also, for simplicity, the points of contact will be referred to as between rollers and the wheel 26, although the actual contact in a physical embodiment would be between the rollers and the tire associated with the wheel.

One of the points of contact 63 is between wheel 26 and first roller or forward roller 22. The second point of contact is between wheel 26 and the rear roller or second roller 24. At each point of contact, an angle is defined between the direction of travel of the wheel (i.e. the tire tread) and the direction of travel of the surface of the roller. In other words, assuming the direction of travel of wheel 26 is defined by an arc and the direction of travel of a roller is defined by a second arc, the angle defined by the intersection of tangent lines drawn at the point of contact between the respective arcs is the slip angle.

Referring now to roller 24 and swing arm 18, if the slip angle does not equal zero, a lateral force is generated by the tire that causes swing arm 18 to rotate about its pivot axis 68. Such rotation of swing arm 18 is in a direction that reduces the magnitude of the slip angle because of the orientation of the pivot axis relative to the point of contact 67; the pivot axis is forward of the point of contact. All other forces acting on swing arm 18 are negligible. Swing arm 18 is preferably mounted on low friction bearings. Therefore, a state of equilibrium is achieved when the lateral force at the point of contact is zero and the slip angle is zero. Lateral force is a function of slip angle. When the slip angle equals zero, the lateral force acting on pivot arm 18 is also zero. Achieving a condition of equilibrium, characterized by zero slip angle, is an essential element of the method of wheel alignment measurement to be described in more detail below.

The movement and functioning of the swing arm 14 is similar to that just described with reference to swing arm 18.

The above description of the functioning of the swing arms is automatic and passive in the sense that no external power (other than the motorized roller 24) is required to correct the position of the swing arm. A correct position of the swing arm is referred to as the position of the swing arm in an equilibrium condition; i.e. zero slip angle.

Swing arms 14 and 18 reach equilibrium almost instantaneously and remain in an equilibrium state throughout the process of aligning the wheel. This is true because of the unique orientation of the elements of wheel support 10 and the independently movable swing arms. When the wheel and wheel support 10 are in equilibrium, there are essentially no unwanted lateral forces applied to the tire by the support rollers. To the extent that any lateral forces exist, they are relatively small compared to the forces associated with the load of the wheel bearing upon rollers 22 and 24. Therefore, to the extent that lateral forces exist, they do not affect wheel alignment measurement and the alignment process is performed with repetitious accuracy.

As can be appreciated from FIGS. 3 and 4, wheel 26 has different camber and steer angles in FIGS. 3 and 4, respectively. The steer angle illustrated in FIG. 4 is approximately 10 degrees. This measurement of steer angle is taken relative to a vertical transverse reference plane. The camber angle of wheel 26 in FIG. 4 is 9 degrees relative to a horizontal reference plane.

During most wheel alignment procedures, the steering wheel of the vehicle is clamped in a straight-ahead position and the front wheels of the vehicle are independently adjusted for steer angle. In some applications, for example including large trucks, it is common practice to allow the steering wheel of the truck to turn freely. Under such conditions, there are too many unconstrained degrees of freedom in the vehicle/machine system. Therefore, alignment settings are not repeatable under such conditions. Where the inventive wheel support 10 is employed, this situation can be resolved by locking one of the four swing arms supporting the two front wheels of the truck such that the locked swing arm remains in a straight-ahead position at all times. It is important to note, that even with one of the swing arms in a locked position no unwanted lateral forces are applied to the tires.

As mentioned in the above description of the prior art, it is desirable to achieve tracking stability of the vehicle on the alignment machine without resorting to physical restraints such as bumpers or rollers. In an embodiment for aligning two wheels of the vehicle, the following principle of operation can be applied using the system of this invention. As described above, the action of the independently pivoting swing arms eliminates any lateral forces from being present at the front wheels of the vehicle. Therefore, the front end of the vehicle is free to drift sideways. The rear wheels of the vehicle rest on a flat surface, such as an assembly plant floor, and, therefore, may roll fore and aft but cannot move sideways. The vehicle effectively will pivot about a vertical axis near the center of the rear axle of the vehicle when the forces supporting the weight of the front end of the vehicle are not all equal at the contact points between the front wheels and rollers. The vehicle will stop pivoting about this vertical axis when the supporting forces at the front of the vehicle are equalized. In other words, each of the two front wheels will seek the lowest point between the respective pair of supporting rollers. The vehicle is free to yaw to allow the two front wheels to be positioned at the lowest points. Once the supporting forces at the front of the vehicle are equalized, the vehicle will continue to maintain a stable tracking position.

Figure 6:
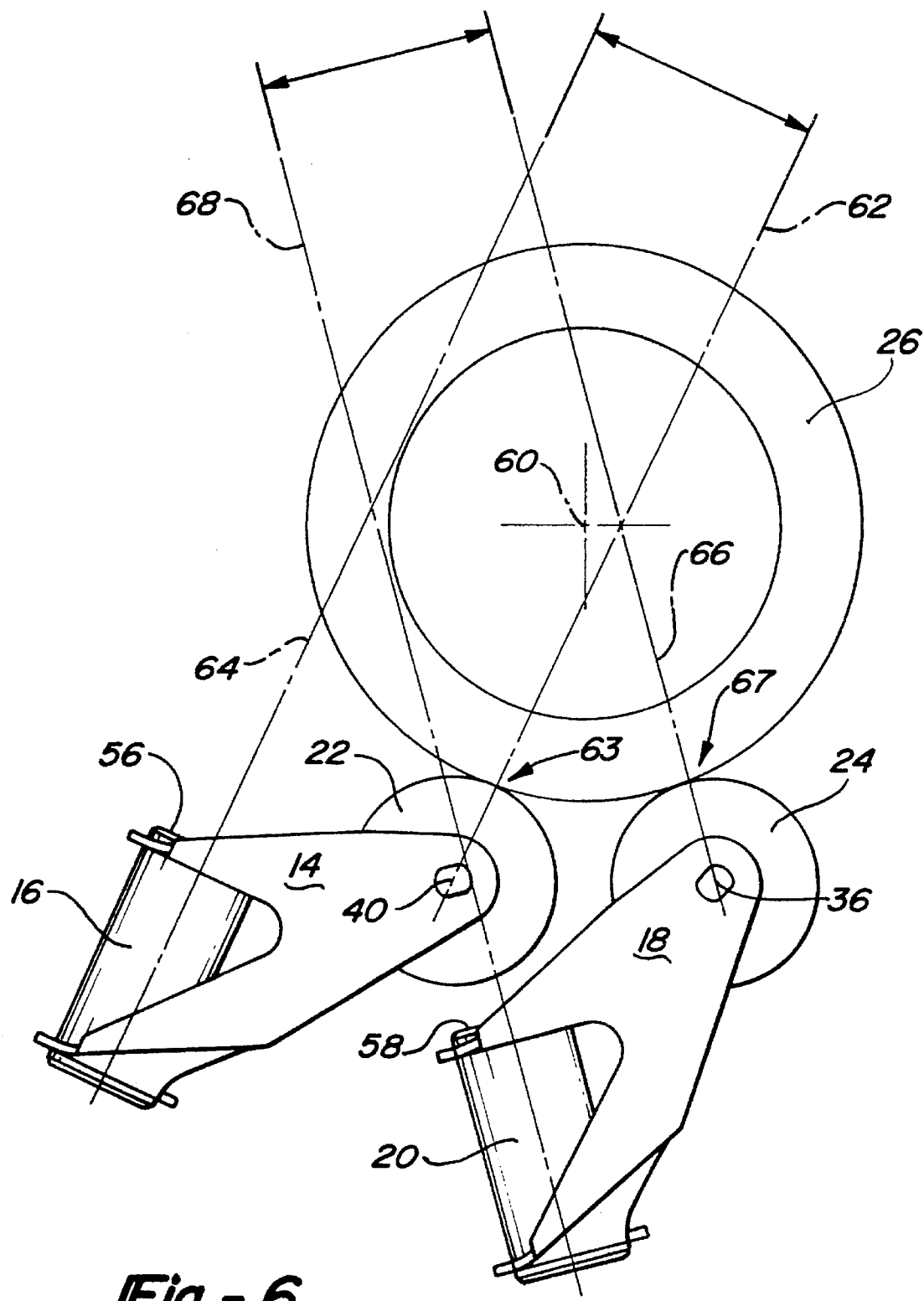
FIG. 6 is a side plan diagrammatic view of portions of the inventive wheel support system showing another preferred geometry and methodology for determining wheel alignment.

It may be desirable to use four respective wheel supports 10 in order to align all four wheels of a vehicle. For such a 4-wheel embodiment, if no lateral forces are allowed at either the front or rear tire contact points, the entire vehicle would be free to drift sideways. Such a scenario is undesirable for obvious reasons. This situation can be resolved by modifying the geometry of the swing arm pivot axes from that shown in FIG. 5 to the geometry illustrated in FIG. 6. In this modified geometry line 62 passes through forward roller axis 40 and through a point 74 somewhat rearward of the wheel axis of rotation 60. Line 62 does not quite pass through the point of contacts 63 between roller 22 and wheel 26. The pivot axis 64 of forward swing arm 14 is parallel to line 62 and offset somewhat in the forward direction. Similarly, line 66 passes through rear roller axis 36 and through point 74. The pivot axis 68 of rear swing arm 18 is parallel to line 66 and offset somewhat forward. The illustrated inclination of the axes 64 and 68 results in a corrective steering action of the swing arms when the vehicle drifts to either side. The force that causes the swing arm to steer is a result of the weight of the vehicle acting at a small distance from the lateral midpoint of the roller. The roller support assemblies are preferably laterally adjustable to match the track width of the vehicle in order to avoid inducing unwanted lateral forces with such an embodiment. Also, at least three of the roller assemblies 10 are preferably free to move in the fore and aft direction by mounting them on linear anti-friction bearings on platform 30.

The inventive wheel support 10 can be used in connection with various conventional wheel alignment measuring systems such as laser detection systems that monitor the travel of the sidewall of a wheel relative to a reference coordinate system, for example. However, the inventive wheel support 10 renders itself highly useful in connection with the following preferred methodology for measuring wheel alignment.

The angle of rotation of each of the swing arms 14 and 18 about their respective pivot axis is measured using angle transducers 56 and 58, respectively. The angle transducers generate electrical signals indicative of swing arm position. These signals are processed by a conventional microprocessor in a conventional manner to facilitate wheel alignment measurement. Other means for measuring the angle of rotation of the swing arms can be employed such as angle encoders or other angle sensitive instruments.

Φ will be used herein to describe the steer angle. The steer angle is related to the angles of rotation of each of the swing arms 14 and 18 by the following formula:

$$\Phi = \text{ARCSIN}((\text{SIN}(\alpha) + \text{SIN}(\delta))/(2 \text{ COS}(\lambda))) \quad \text{(equation 1)}$$

where $\alpha$ = the angle of rotation of swing arm 14 about pivot axis 64, where $\delta$ = the angle of rotation of swing arm 18 about pivot axis 68, and $\lambda$ = the angle of the pivot axes 64 and 68 from vertical.

The camber angle is referred to as Θ in the following description. The camber angle is related to the angles of rotation of swing arms 14 and 18 by the following formula:

$$\Theta = \text{ARCSINC}(\text{SIN}(\delta) - \text{SIN}(\alpha))/(2 \text{ SIN}(\lambda)); \quad \text{(equation 2)}$$

where $\alpha$ = the angle of rotation of swing arm 14 about pivot axis 64, $\delta$ = the angle of rotation of swing arm 18 about pivot axis 68, and $\lambda$ = the angle of the pivot axes 64 and 68 from vertical.

Having these two equations, a wheel alignment measurement and adjustment can be accomplished given either a preselected or predetermined value for the toe and camber angles or the two angles of rotation of the pivot arms. In other words, if an operator has a pre-selected toe angle and camber angle, the inventive roller support system 10 can facilitate proper wheel alignment adjustment in the following general manner.

The vehicle is placed upon the appropriate number of wheel supports 10. The motor driven rollers 24 are turned on. The vehicle is allowed to stabilize and the swing arms are allowed to reach equilibrium. The measured values $\alpha$ and $\delta$ in the form of electronic signals from the angle transducers are fed into a conventional microprocessor. The microprocessor is programmed to solve for Φ and Θ using equations 1 and 2. The microprocessor further solves for the toe angle by subtracting the calculated value of Φ for the left hand wheel from Θ for the right hand wheel.

The calculated values of toe and camber angles are presented to the operator on a display. The operator compares the calculated values with the preselected values. If the difference is more than an acceptable tolerance, the operator makes an adjustment to the suspension of the vehicle. Normally, only the toe angle is adjusted in this manner since the camber of most vehicles is not designed to be easily adjustable.

The calculated values of toe and camber are updated so rapidly that the operator perceives the display to respond to his adjustments in real time. This instantaneous feedback greatly facilitates the adjustment process.

A second methodology includes having the equations 1 and 2 and the pre-selected values for toe and camber angle, the actual values for the angles of rotation of the respective swing arms and rollers can be calculated. An operator adjusts the wheel steer and camber angles until $\alpha$ and $\delta$ reach the calculated desired values. At this point, the operator knows from the desired position of the swing arms and rollers that wheel 26 is in the desired alignment; that is the wheel has the preselected toe and camber angles. This is true because of the dependent relationship between steer and camber angles and the angle positions of the rollers.

The vehicle is placed upon the appropriate number of roller supports 10 and the operator uses an instantaneous readout of the angles of rotation of the swing arms in order to determine what adjustments need to be made to the vehicle suspension. This process is reiterated until the swing arms are placed in a position automatically by wheel 26 as described above such that all four angles are at the desired values.

The process just described can be automated using conventional robotics coupled to a feedback calculation of $\Phi$ and $\Theta$ as the wheel alignment is adjusted.

The preceding description is exemplary rather than limiting in nature. Variations and modifications of the preferred embodiments described above will become apparent to those skilled in the art that do not depart from the purview and spirit of this invention. Therefore, the scope of this invention is to be limited only by the appended claims, including all legal equivalents thereof.

I claim:

1. A vehicle wheel support device for use in wheel alignment operations, comprising:

a base;

a first roller mounted on said base such that said first roller rotates relative to said base about a first roller axis and such that said first roller pivots relative to said base about a first pivot axis that is nonparallel to said first roller axis;

a second roller mounted on said base such that said second roller rotates relative to said base about a second roller axis and such that said second roller pivots relative to said base about a second pivot axis that is nonparallel to said second roller axis; and wherein said first and second rollers independently pivot relative to said base, said first and second rollers being adapted to support a vertical load of a vehicle wheel that is placed on said rollers.

2. The support device of claim 1, wherein said first and second rollers each are generally cylindrical having an outer surface that is adapted to directly contact tire treads on a vehicle wheel.

3. The support device of claim 1, further comprising a motor, operatively coupled to one of said rollers, for providing powered rotation of said one of said rollers relative to said base.

4. The support device of claim 1, wherein said first roller is mounted on said base by a swing arm that pivots about said first pivot axis and wherein said first roller rotates relative to said swing arm.

5. The support device of claim 1, wherein said second roller is mounted on said base by a swing arm that pivots about said second pivot axis and wherein said second roller rotates relative to said swing arm.

6. The support device of claim 1, wherein said first roller is mounted on said base by a first swing arm that pivots about said first pivot axis and wherein said second roller is mounted on said base by a second swing arm that pivots about said second pivot axis and wherein said first and second pivot axes are nonparallel.

7. A vehicle wheel alignment device, comprising:

a base;

a first roller coupled to said base such that said first roller rotates relative to said base about a first roller axis;

a second roller coupled to said base such that said second roller rotates relative to said base about a second roller axis, said first roller being supported for pivotal movement relative to said base and relative to said second roller;

means for determining a pivot position of said first roller relative to said base;

means for determining an alignment orientation of the vehicle wheel, coupled to said position determining means; and wherein said first and second rollers support the vertical load of a vehicle wheel that is placed on said rollers.

8. The device of claim 7, wherein said second roller is supported for pivotal movement relative to said base and further comprising means for determining a pivot position of said second roller relative to said base coupled to said alignment orientation determining means.

9. The device of claim 7, wherein said first and second rollers independently pivot relative to said base.

10. The device of claim 7, wherein said first roller is coupled to said base by a first swing arm that pivots relative to said base about a first pivot axis, said first roller being spaced apart from said first pivot axis and wherein said first roller rotates relative to said first swing arm.

11. The device of claim 10, wherein said first pivot axis is parallel to a line defined through said first roller axis and a vehicle wheel axis of rotation when the vehicle wheel is placed upon said rollers.

12. The device of claim 7, wherein said second roller is coupled to said base by a swing arm that pivots relative to said base about a pivot axis, said second roller being spaced apart from said pivot axis and wherein said second roller rotates relative to said swing arm.

13. The device of claim 12, wherein said pivot axis is parallel to a line defined through said second roller axis and a vehicle wheel axis of rotation when the vehicle wheel is placed upon said rollers.

14. The device of claim 7, wherein said first and second rollers are coupled to said base by respective swing arms that independently pivot relative to said base about first and second pivot axes, respectively and wherein said first and second pivot axes are nonparallel.

15. The device of claim 7, wherein said first roller is coupled to said base by a first swing arm, said first swing arm pivoting relative to said base about a first pivot axis that does not intersect said first roller axis, said first swing arm having a central portion and a pair of extensions extending from said central portion, said first swing arm supporting said first roller between said first pair of extensions, said first roller being spaced apart from said central portion and rotatable relative to said first swing arm.

16. The device of claim 15, wherein said second roller is coupled to said base by a second swing arm, said second swing arm pivoting relative to said base about a second pivot axis that does not intersect said second roller axis, said second swing am having a central portion and a pair of extensions extending from said central portion, said second swing arm supporting said second roller between said second pair of extensions, said second roller being spaced apart from said central portion and rotatable relative to said second swing arm, and wherein the wheel alignment is determined by said alignment determining means using respective pivot angles of said first and second swing arms relative to said base, said pivot angles being determined by said movement position determining means.

17. A method for determining the alignment of a vehicle wheel using a vehicle wheel support device having a pair of rollers that independently rotate and pivot relative to a base and wherein the rollers support a vertical load of the vehicle wheel, comprising the steps of:

(A) placing the vehicle wheel on the support device such that the load and alignment of the wheel move the rollers relative to the base;

(B) determining a first pivot position of one of the rollers relative to the base;

(C) determining a second pivot position of the other of the rollers relative to the base; and (D) determining the alignment of the vehicle wheel using the pivot positions determined in steps (B) and (C), respectively, and a predetermined relationship between the pivot positions and the wheel alignment.

18. The method of claim 17, wherein step (D) is performed by the substeps of determining a relationship between a first alignment angle and the pivot positions of steps (B) and (C), respectively;

determining a relationship between a second alignment angle and the pivot positions of steps (B) and (C), respectively; and determining the alignment of the vehicle wheel from the first and second alignment angles.

* * * * *